(12) United States Patent
Wood et al.

(10) Patent No.: US 6,639,048 B1
(45) Date of Patent: Oct. 28, 2003

(54) METHOD FOR REDUCING THE QUANTITY OF RESIDUAL MONOMERS IN AQUEOUS POLYMERISATE DISPERSIONS

(75) Inventors: Claudia Wood, Weinheim (DE); Reinhard Schneider, Fussgönheim (DE); Eberhard Beckmann, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/069,963

(22) PCT Filed: Aug. 31, 2000

(86) PCT No.: PCT/EP00/08509

§ 371 (c)(1),
(2), (4) Date: Mar. 8, 2002

(87) PCT Pub. No.: WO01/18070

PCT Pub. Date: Mar. 15, 2001

(30) Foreign Application Priority Data

Sep. 8, 1999 (DE) .......................................... 199 42 776

(51) Int. Cl.[7] .................................. C08F 6/00
(52) U.S. Cl. ........................ 528/480; 524/800; 524/832; 525/329.1; 525/329.2; 525/329.3; 525/329.4; 525/329.5; 525/329.6; 525/370; 525/371; 525/387; 526/919

(58) Field of Search ...................... 528/480; 525/329.1, 525/329.2, 330.3, 330.4, 330.6, 344, 345, 370, 371, 387; 524/800, 832; 526/919

(56) References Cited

U.S. PATENT DOCUMENTS 6,365,709 B1 * 4/2002 Heibel et al. ................ 528/480
6,433,132 B1 * 8/2002 Wood et al. ................. 528/480
6,462,138 B1 * 10/2002 Rupaner et al. .......... 525/329.1

FOREIGN PATENT DOCUMENTS

| DE | 197 41 184 | 3/1999 |
|---|---|---|
| DE | 198 39 199 | 3/2000 |
| EP | 0 590 468 | 4/1994 |
| EP | 0 767 180 | 10/1996 |
| WO | 95/33775 | 12/1995 |

* cited by examiner

Primary Examiner—Terressa M. Boykin
(74) Attorney, Agent, or Firm—Oblon, Spivak, McClelland, Maier & Neustadt, P.C.

(57) ABSTRACT

A process for reducing the residual monomer amount in aqueous polymer dispersions comprises aftertreating with a redox initiator system.

17 Claims, No Drawings

METHOD FOR REDUCING THE QUANTITY OF RESIDUAL MONOMERS IN AQUEOUS POLYMERISATE DISPERSIONS

BACKGROUND OF THE INVENTION

1. Field of the Invention

The invention relates to a process for reducing the amount of residual monomer in aqueous polymer dispersions by chemical aftertreatment with an initiator system.

2. Description of the Background

Following their preparation by a free-radically initiated aqueous emulsion polymerization, aqueous addition-polymer dispersions include not only a polymer solids fraction of generally from 30 to 75% by weight but also an unwanted fraction of unpolymerized, free ethylenically unsaturated monomers (residual monomers). This fraction originates from incomplete polymerization of the ethylenically unsaturated monomers used in the free-radical main polymerization, which is usually carried out to a monomer conversion of 95% by weight and preferably from 98 to 99% by weight. On mainly toxicological grounds the market requires aqueous polymer systems having a low residual monomer content with no change in processing and performance properties.

For the use of reducing agents based on organic carbonyl compounds in the chemical aftertreatment of aqueous polymer dispersions it is necessary to start from the following prior art.

According to WO 95/33775, aqueous polymer dispersions can be chemically aftertreated using redox systems whose reducing agent comprises an adduct of hydrogen sulfite anion and a ketone of 3 to 8 carbon atoms, and/or the conjugate acid of this adduct. Aftertreatment is performed in the presence of metal compounds that are soluble in the aqueous medium.

For the reduction of residual monomer contents, EP-A 767 180 advises a redox initiator system comprising organic hydroperoxides whose solubility in water is, at best, poor and comprising, inter alia, adducts of aldehydes whose carbon chain has 4 to 6 carbon atoms with bisulfites.

The application filed under number 19839199.4 at the German Patent and Trademark Office discloses lowering the residual monomer contents in aqueous polymer dispersions by aftertreatment with a redox initiator system comprising a peroxide-containing oxidizing agent and a reaction product of aldehydes and inorganic dithionites.

DE-A 19743759 discloses reducing agents comprising derivatives of sulfinic acid which are obtainable on the basis of substituted carbonyl compounds and which are used, inter alia, as a constituent of redox initiator systems for reactions including free-radically initiated aqueous emulsion polymerization.

SUMMARY OF THE INVENTION

It is an object of the present invention to provide a novel effective process for reducing the amount of residual monomer in aqueous addition-polymer dispersions. Furthermore, the reduction in the amount of residual monomer should be easy to implement industrially and should avoid the formation of microcoagulum.

We have found that this object is achieved and thus that the amount of residual monomers in aqueous addition-polymer dispersions can be advantageously reduced if the chemical aftertreatment of the aqueous polymer dispersions comprising residual monomers is carried out with the addition of a redox initiator system comprising essentially a) from 0.001 to 5% by weight, based on the total monomer amount used to prepare the polymer dispersion, of $a_1$) at least one oxidizing agent $R^1OOH$ in which $R^1$ is hydrogen or an alkyl or aryl group, and/or $a_2$) at least one compound which in aqueous medium releases hydrogen peroxide, and b) from 0.005 to 5% by weight, based on the total monomer amount used to prepare the polymer dispersion, of at least one reducing agent prepared from $b_1$) a carbonyl compound of the formula I $$R^2(C=O)R^3 \qquad (I)$$

in which
  $R^2$ is a hydrogen atom or an alkyl, alkenyl, cycloalkyl or aryl group with or without one, two or three substituents which independently of one another are selected from hydroxyl, alkyl, O-alkyl, halogen and trihalomethyl, and
  $R^3$ is $-CO_2M$, $-SO_3M$, $-(C=O)R^4$ or $-CO_2R^5$, where M is a hydrogen atom, an ammonium ion, a monovalent metal ion or one equivalent of a divalent metal ion from Groups Ia, IIa, IIb, IVa or VIIIb of the Periodic Table, $R^4$ is a hydrogen atom or an alkyl group and $R^5$ is an alkyl group, and, if $R^2$ is an alkyl, alkenyl, cycloalkyl or aryl group, $R^3$ can also be a methyl group, and $b_2$) an inorganic dithionite.

DETAILED DESCRIPTION OF THE PREFERRED EMBODIMENTS

The said at least one oxidizing agent of the redox initiator system should be in a position to form free radicals. The oxidizing agent used in the redox initiator system of the invention is preferably hydrogen peroxide. In many cases, however, use is also made of potassium peroxide, sodium peroxide, sodium perborate, and further precursors which in aqueous medium form hydrogen peroxide. It is also possible, for example, to use ammonium, potassium or sodium persulfate, peroxodisulfuric acid and its mono- and di-ammonium, -potassium or -sodium salts, and also ammonium, potassium or sodium perphosphate or diperphosphate, potassium manganate, and other salts of per acids. Likewise suitable in principle are organic hydroperoxides, such as tert-butyl hydroperoxide and cumene hydroperoxide, for example. It is also possible to use mixtures of different oxidizing agents.

The amount of the at least one oxidizing agent added in the aftertreatment in accordance with the invention is customarily within the range from 0.001 to 5% by weight, preferably from 0.002 to 3% by weight, with particular preference from 0.003 to 2% by weight, with very particular preference from 0.01 to 1% by weight, and, preferably, from 0.02 to 0.5% by weight, based on the total monomer amount used to prepare the polymer dispersion.

The at least one reducing agent used in the aftertreatment of the invention comprises reaction products of carbonyl compounds of the formula I with inorganic dithionites such as, for example, sodium dithionite, potassium dithionite, magnesium dithionite, calcium dithionite, strontium dithionite, barium dithionite and zinc dithionite or mixtures thereof. Sodium dithionite is preferably used.

Carbonyl compounds of the formula I used in accordance with the invention are compounds in which $R^2$ is a hydrogen atom or an alkyl, alkenyl, cycloalkyl or aryl group with or without one, two or three substituents which independently of one another are selected from hydroxyl, alkyl, O-alkyl, halogen and trihalomethyl, and $R^3$ is —$CO_2M$, —$SO_3M$, —(C=O)$R^4$ or —$CO_2R^5$, where M is a hydrogen atom, an ammonium ion, a monovalent metal ion or one equivalent of a divalent metal ion from groups Ia, IIa, IIb, IVa or VIIIb of the Periodic Table, $R^4$ is a hydrogen atom or an alkyl group and $R^5$ is an alkyl group, and, if $R^2$ is an alkyl, alkenyl, cycloalkyl or aryl group, $R^3$ can also be a methyl group.

For the purposes of the present invention, the expressions set out below preferably have the following meanings: alkyl is straight-chain or branched alkyl groups having generally 1 to 6 and frequently 1 to 4 carbon atoms. Examples of alkyl groups are methyl, ethyl, n-propyl, isopropyl, n-butyl, tert-butyl, n-hexyl etc. The same applies to the alkyl group within O-alkyl. Alkenyl is straight-chain or branched alkenyl groups having generally 3 to 8 and frequently 3 to 6 carbon atoms. A preferred alkenyl group is the allyl group. Cycloalkyl is, in particular, $C_3$ to $C_6$ cycloalkyl, particular preference being given to cyclopentyl or cyclohexyl. Aryl is preferably phenyl or naphthyl. If the aryl radical is a phenyl group and is substituted, it preferably has two substituents. These substituents are present in particular in positions 2 and/or 4. Halogen is fluorine, chlorine, bromine and iodine, preferably chlorine and bromine and, in the case of trihalomethyl, preferably fluorine. M is preferably an ammonium ion, an alkali metal ion or one equivalent of an alkaline earth metal ion or zinc ion. Suitable alkali metal ions are, in particular, sodium ions and potassium ions; suitable alkaline earth metal ions are, primarily, magnesium ions and calcium ions.

Preference is given to the use of a carbonyl compound of the formula I in which $R^2$ is a hydrogen atom and $R^3$ is —$CO_2M$ or —$CO_2R^4$ where M and $R^4$ are as defined above. Particular preference is given to glyoxylic acid ($R^2$ is a hydrogen atom and $R^3$ is —$CO_2M$, M likewise being a hydrogen atom) and/or its monohydrate. Likewise of particular importance are carbonyl compounds in which $R^2$ is methyl, ethyl or propyl and $R^3$ is methyl. Use is frequently made of acetone ($R^2$ and $R^3$ are methyl).

Carbonyl compounds of the formula I and inorganic dithionites can be used in said at least one reducing agent in a molar ratio of from 0.1:1 to 1:0.1, preferably from 0.3:1 to 1:0.3, with particular preference from 0.5:1 to 1:0.5, and, with very particular preference, 1:0.5.

The amount of said at least one reducing agent used in accordance with the invention is customarily within the range from 0.005 to 5% by weight, preferably from 0.01 to 3% by weight, with particular preference from 0.03 to 2% by weight, and, with very particular preference, from 0.05 to 1% by weight, based on the total monomer amount used to prepare the polymer dispersion. Larger amounts of reducing agent, although possible, are not generally sensible from an economic standpoint.

The metal compounds advantageous for the aftertreatment are those which are completely soluble in the aqueous medium of the polymer dispersion and whose metallic component, moreover, is capable of existing in a plurality of valence states. The dissolved metal ions have a catalytic action and assist the electron transfer reactions between the actually active oxidizing and reducing agents. Suitable dissolved metal ions are principally iron, copper, manganese, vanadium, nickel, cobalt, titanium, cerium, and chromium ions. It is of course also possible to use mixtures of different, mutually compatible metal ions, such as, for example, the system $Fe^{2/3+}/VSO_4^-$. Frequently, iron ions are used.

The dissolved metal ions are used in catalytic amounts, usually within the range from 1 to 1,000 ppm, frequently from 5 to 500 ppm and often from 10 to 100 ppm, based on the total monomer amount used to prepare the polymer dispersion.

For the aftertreatment of the polymer dispersion, which is heated at from about 50 to 150° C., preferably from 60 to 120° C. and, with particular preference, from 80 to 100° C., the components of the redox initiator system used in accordance with the invention are judiciously metered in gradually with stirring and preferably under atmospheric pressure or, alternatively, under a pressure of greater than or less than 1 bar (absolute), metered addition taking place simultaneously or in succession, in the latter case preferably with addition of the at least one oxidizing agent first. A particularly favorable procedure is the simultaneous metered addition of said at least one oxidizing agent and said at least one reducing agent by way of two separate feed streams. In this case the initiator components can be added, for example, from above, from below, or through the side of the reactor. Preferably, however, the initiator system is metered in from below. Since the optimum duration of initiator metering is dependent on the monomer composition, on the size of the reaction mixture, and on the geometry of the reactor, it is judicious to determine said duration in simple preliminary experiments. Depending on the task at hand, the duration of addition of initiator may amount to a few seconds or several hours. Where catalytic amounts of metal compound are used in the aftertreatment, it is particularly advantageous to add them to the polymer dispersion prior to the addition of said at least one oxidizing agent and said at least one reducing agent.

The aftertreatment is customarily conducted at a pH of $\leq 8$. To adjust the pH of the aqueous polymer dispersion it is possible in principle to use bases, such as sodium hydroxide solution, aqueous ammonia, or triethanolamine, for example. For the aftertreatment of the aqueous polymer dispersion a favorable pH range is that $\geq 2$ and $\leq 8$, with preference being given to a pH range between $\geq 3$ and $\leq 7$. If the pH is established using bases it is possible in adverse circumstances to obtain local areas having briefly higher pH values, in which the catalyzing metal ions, if added, would be converted into poorly soluble hydroxides or hydroxo complexes. In order to maintain sufficient concentrations of the metal ions during the aftertreatment, therefore, it is particularly advantageous to add complexing agents, such as ethylenediaminetetraacetic acid (EDTA), nitrilotriacetic acid and diethylenetriaminepentaacetic acid and/or their respective sodium salts, for example, and/or to use stable metal ion complexes, such as iron(III)/sodium ethylenediaminetetraacetate (Fe/Na-EDTA), for example.

The process of the invention is particularly suitable for reducing the amount of residual monomer in aqueous polymer dispersions obtainable by free-radically initiated aqueous emulsion polymerization of at least one ethylenically unsaturated monomer.

Suitable such monomers for the process of the invention include, in particular, monomers which can be subjected to free-radical polymerization in a simple manner, examples being olefins such as ethylene, vinylaromatic monomers, such as styrene, α-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate and vinyl stearate, esters of preferably $C_3$–$C_6$ α,β-monoethylenically unsaturated mono- and dicarboxylic acids, such as especially acrylic acid, methacrylic acid, maleic acid, fumaric acid and itaconic acid, with generally $C_1$–$C_{12}$, preferably $C_1$–$C_8$ and, in particular, $C_1$–$C_4$ alkanols, such as especially methyl, ethyl, n-butyl, isobutyl and 2-ethylhexyl acrylate and methacrylate, dimethyl maleate or di-n-butyl maleate, nitrites of α,β-monoethylenically unsaturated carboxylic acids, such as acrylonitrile, and also $C_{4-8}$ conjugated dienes, such as 1,3-butadiene and isoprene. In the case of aqueous polymer dispersions produced exclusively by the method of free-radical aqueous emulsion polymerization, said monomers generally form the principal monomers, which, based on the total amount of monomers to be polymerized by the process of free-radically initiated aqueous emulsion polymerization, normally account for a proportion of more than 50% by weight. As a general rule, the solubility of these monomers in water under standard conditions (20° C., 1 atm) is only moderate to poor.

Examples of monomers having a heightened solubility in water under the above conditions are α,β-monoethylenically unsaturated mono- and dicarboxylic acids and their amides, such as, for example, acrylic acid, methacrylic acid, maleic acid, fumaric acid, itaconic acid, acrylamide and methacrylamide, and also vinylsulfonic acid and water-soluble salts thereof, and N-vinylpyrrolidone.

In the case of aqueous polymer dispersions produced exclusively by the method of free-radical aqueous emulsion polymerization, the abovementioned monomers of heightened solubility in water are normally copolymerized only as modified monomers. In this case, amounts of less than 50% by weight, generally from 0.5 to 20% by weight, preferably from 1 to 10% by weight, based on the total amount of monomers to be polymerized, are used.

Monomers which usually enhance the internal strength of the films of the aqueous polymer dispersions normally have at least one epoxy, hydroxyl, N-methylol or carbonyl group, or at least two nonconjugated ethylenically unsaturated double bonds. Examples thereof are N-alkylolamides of $C_3$–$C_{10}$-α,β-monoethylenically unsaturated carboxylic acids, among which very particular preference is given to N-methylolacrylamide and N-methylolmethacrylamide, and their esters with $C_1$–$C_4$ alkanols. Also suitable are monomers having two vinyl radicals, two vinylidene radicals, or two alkenyl radicals. Particularly advantageous in this context are the diesters of dihydric alcohols with α,β-monoethylenically unsaturated monocarboxylic acids, among which acrylic and methacrylic acid are preferred. Examples of such monomers having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate and triallyl isocyanurate. Also of particular importance in this context are the $C_1$–$C_8$ hydroxyalkyl esters of acrylic and methacrylic acid, such as n-hydroxyethyl, n-hydroxypropyl or n-hydroxybutyl acrylate and methacrylate, and compounds such as diacetone acrylamide and acetylacetoxyethyl acrylate and methacrylate. In the case of aqueous polymer dispersions produced exclusively by the method of free-radical aqueous emulsion polymerization, the abovementioned monomers are copolymerized mostly in amounts of from 0.5 to 10% by weight, based on the total amount of monomers to be polymerized.

The preparation of aqueous addition-polymer dispersions has been described beforehand on numerous occasions and is therefore sufficiently well known to the skilled worker [cf., e.g., Encyclopedia of Polymer Science and Engineering, Vol. 8, p. 659 ff. (1987); D.C. Blackley in High Polymer Latices, Vol. 1, p. 35 ff. (1966); Emulsion Polymerization, Interscience Publishers, New York (1965), and Dispersionen synthetischer Hochpolymerer [Dispersions of Synthetic High polymers], F. Hölscher, Springer-Verlag, Berlin (1969)]. It takes place by emulsion polymerization of monomers having at least one ethylenically unsaturated group in the presence of a preferably water-soluble polymerization initiator and of emulsifiers and, if desired, protective colloids and customary further additives. In general, the monomers are added by continuous feed. As free-radical initiator it is preferred to use peroxodisulfuric acid and/or its salts in amounts of from 0.1 to 2% by weight, based on the total amount of the monomers. The polymerization temperature is generally from 20 to 150° C. and, preferably, from 60 to 120° C. The polymerization may take place under superatmospheric pressure. Emulsifiers used are, in particular, anionic emulsifiers alone or in a mixture with nonionic dispersants in an amount of in particular from 0.5 to 6% by weight of the total monomer amount.

The aftertreatment of the aqueous polymer dispersion that is carried out in accordance with the invention in order to reduce the residual monomer amount is conducted in particular after at least 95% by weight and, preferably, from at least 98 to 99% by weight of the total monomer amount in the free-radical emulsion polymerization have undergone reaction. The conditions in the case of the main polymerization and in the case of the aftertreatment are generally different. Thus, during the main polymerization, with a high concentration of monomers and of growing and hence more and more hydrophobic oligomer radicals, the entry of radicals into the dispersion particles takes place readily, whereas such entry is generally very difficult during the aftertreatment, owing to the low monomer concentration and the lack of growing oligomer radicals. In the preparation of aqueous polymer dispersions, therefore, different initiator systems are generally required for the main polymerization and for the aftertreatment.

Like processes of free-radical addition polymerization in general, the process of the invention, too, normally takes place under an inert gas atmosphere (e.g., $N_2$, Ar).

It is of course possible to subject the aftertreated aqueous polymer dispersions to stripping with inert gas and/or steam. It is also possible, however, to precede the chemical aftertreatment of the invention by inert gas and/or steam stripping.

It is also of importance that, in the case of aqueous polymer dispersions whose polymers have been prepared by means of ionic initiation or by free-radical solution polymerization, it is likewise possible, if required, to carry out an aftertreatment in accordance with the invention.

EXAMPLES

Example 1

A styrene n-butyl acrylate dispersion prepared by free-radical polymerization from 23 kg of styrene, 25 kg of n-butyl acrylate, 2 kg of acrylic acid, 1.2 kg of styrene seed latex (34% by weight in water, particle size about 30 to 35 nm), 45 g of sodium lauryl sulfate, 225 g of Dowfax®2 A1 (dodecylphenoxybenzenedisulfonic acid sodium salt), 75 g of sodium hydroxide, 150 g of sodium peroxodisulfate and 46.755 kg of water at 80° C. had a solids content of 52% by weight and a pH of 4.3.

52 g of distilled water were added to 1298 g of this dispersion, to give a dispersion having a solids content of 50%. The dispersion diluted to 50% by weight contained 7398 ppm of n-butyl acrylate, 764 ppm of styrene and 3140 ppm of acrylic acid. In the aftertreatment, this aqueous polymer dispersion was admixed with 0.02 g of Fe/Na-EDTA complex and heated to 85° C. Subsequently a) 30 g of a 0.68% strength by weight aqueous hydrogen peroxide solution and b) 30 g of a solution prepared from 0.51 g of an aqueous 89% strength by weight sodium dithionite solution, 0.44 g of glyoxylic acid monohydrate and 29.05 g of water were metered in simultaneously with stirring in two separate feed streams at a rate of addition of 10 g per hour in each case. The resultant residual amounts of n-butyl acrylate and styrene were determined by gas chromatography, the residual amounts of acrylic acid by means of HPLC. The results obtained in the aftertreatment are set out in Table 1.

TABLE 1

Residual monomer amounts of the aqueous polymer dispersion in the aftertreatment

| Time min | Styrene ppm | n-Butyl acrylate ppm | Acrylic acid ppm |
| --- | --- | --- | --- |
| 0 | 764 | 7398 | 3140 |
| 20 | 327 | 3180 | |
| 40 | 128 | 1564 | |
| 60 | 87 | 753 | |
| 120 | 2 | 173 | |
| 180 | 2 | 128 | |
| 240 | 2 | 126 | 10 |

Example 2

A styrene n-butyl acrylate dispersion was prepared as in Example 1. It had a solids content of 52% by weight and a pH of 4.3.

52 g of distilled water were added to 1298 g of this dispersion, to give a dispersion having a solids content of 50%. The dispersion diluted to 50% by weight contained 7348 ppm of n-butyl acrylate, 753 ppm of styrene and 3080 ppm of acrylic acid. In the aftertreatment, this aqueous polymer dispersion was admixed with 0.02 g of Fe/Na-EDTA complex and heated to 85° C. Subsequently a) 30 g of a 0.68% strength by weight hydrogen peroxide solution and b) 30 g of a solution prepared from 0.51 g of an aqueous 89% strength by weight sodium dithionite solution, 0.28 g of acetone and 29.2 g of water were metered in simultaneously with stirring in two separate feed streams at a rate of addition of 10 g per hour in each case. The resultant residual amounts of n-butyl acrylate and styrene were determined by gas chromatography, the residual amounts of acrylic acid by means of HPLC. The results obtained in the aftertreatment are set out in Table 2.

TABLE 2

Residual monomer amounts of the aqueous polymer dispersion in the aftertreatment

| Time min | Styrene ppm | n-Butyl acrylate ppm | Acrylic acid ppm |
| --- | --- | --- | --- |
| 0 | 753 | 7348 | 3080 |
| 20 | 589 | 6203 | |
| 40 | 424 | 5230 | |
| 60 | 315 | 3831 | |
| 120 | 142 | 2173 | |
| 180 | 43 | 1128 | |
| 240 | 40 | 976 | 120 |

We claim:

1. A process for reducing the amount of residual monomer in aqueous polymer dispersions by chemical treatment after monomer polymerization with an initiator system, which comprises:

conducting the chemical treatment of the aqueous polymer dispersion by addition of an initiator system consisting essentially of:

a) from 0.001 to 5% by weight, based on the total monomer amount required to prepare the polymer dispersion, of:

a$_1$) at least one oxidizing agent R$^1$OOH in which R$^1$ is hydrogen or an alkyl or aryl group, and/or a$_2$) at least one compound which in aqueous media releases hydrogen peroxide; and b) 0.005 to 5% by weight, based on the total monomer amount required to prepare the polymer dispersion, of a combination of reducing agents b$_1$) and b$_2$) wherein:

b$_1$) is a carbonyl compound of the formula I $$R^2(C{=}O)R^3$$

in which R$^2$ is hydrogen or an alkyl, alkenyl, cycloalkyl or aryl group with or without one, two or three substituents which independently of one another are selected from the group consisting of hydroxyl, alkyl, O-alkyl, halogen and trihalomethyl, and R$^3$ is —CO$_2$M, —SO$_3$M, —(C=O)R$^4$ or —CO$_2$R$^5$, where M is hydrogen, ammonium ion, a monovalent metal ion or one equivalent of a divalent metal ion selected from the group consisting of Groups Ia, IIa, IIb, IVa and VIIIb of the Periodic Table, R$^4$ is hydrogen or an alkyl group and R$^5$ is an alkyl group, and b$_2$) is an inorganic dithionite.

2. The process as claimed in claim 1, wherein said at least one oxidizing agent is hydrogen peroxide.

3. The process as claimed in claim 1, wherein sodium dithionite is said inorganic dithionite.

4. The process as claimed in claim 1, wherein glycolic acid is used as the carbonyl compound of formula I.

5. The process as claimed in claim 1, wherein the carbonyl compound of formula I and the inorganic dithionite are employed in said reducing agent combination in a molar ratio ranging from 0.1:1 to 1:0.1.

6. The process as claimed in claim 1, wherein said at least one oxidizing agent and said reducing agent combination are supplied to the polymer dispersion simultaneously in separate feed streams during the chemical treatment.

7. The process as claimed in claim 1, wherein the temperature of the polymer dispersion during the chemical treatment ranges from 50 to 150° C.

8. The process as claimed in claim 1, wherein the chemical treatment is conducted under atmospheric pressure (1 bar absolute).

9. The process as claimed in claim 1, wherein the pH of the polymer dispersion during the chemical treatment is $\geq 2$ to $\leq 8$.

10. The process as claimed in claim 5, wherein said molar ratio ranges from 0.3:1 to 1:0.3.

11. The process as claimed in claim 1, wherein the combination of reducing agents b) ranges from 0.01 to 3% by weight.

12. The process as claimed in claim 7, wherein said temperature of the polymer dispersion during the chemical treatment ranges from 60 to 120° C.

13. The process as claimed in claim 1, wherein the monomer(s) polymerized to prepare the polymer dispersion are selected from the group consisting of olefins, vinylaromatic compounds, esters of vinyl alcohol and monocarboxylic acids of 1 to 18 carbon atoms, esters of $C_3$–$C_6$ $\alpha,\beta$-monoethylenically unsaturated mono- and dicarboxylic acids with $C_1$–$C_{12}$ alkanols, nitriles of $\alpha,\beta$-monoethylenically unsaturated carboxylic acids and $C_{4-8}$-conjugated dienes.

14. The process as claimed in claim 9, wherein the pH of the polymer dispersion during the chemical treatment is $\geq 3$ to $\leq 7$.

15. The process as claimed in claim 1, wherein the amount of said at least one oxidizing agent a) ranges from 0.002 to 3 % by weight.

16. The process as claimed in claim 1, wherein the inorganic dithionite is potassium dithionite, magnesium dithionite, calcium dithionite, strontium dithionite, barium dithionite, zinc dithionite or combinations thereof.

17. The process as claimed in claim 1, wherein for groups $R^1$ to $R^3$, alkyl is straight-chain or branched alkyl of 1 to 6 carbon atoms, alkenyl is straight-chain or branched alkenyl of 3 to 8 carbon atoms, cycloalkyl is $C_{3-6}$-cycloalkyl and aryl is phenyl or naphthyl.

* * * * *